US008366038B2

(12) United States Patent  (10) Patent No.: US 8,366,038 B2
Marche  (45) Date of Patent: Feb. 5, 2013

(54) DEVICE FOR FASTENING A TURBOJET ENGINE TO AN AIRCRAFT FIXING STRUT

(75) Inventor: Hervé Marche, Roquettes (FR)

(73) Assignee: Airbus Operations SAS, Toulouse (FR)

( * ) Notice: Subject to any disclaimer, the term of this patent is extended or adjusted under 35 U.S.C. 154(b) by 846 days.

(21) Appl. No.: 12/084,393

(22) PCT Filed: Oct. 24, 2006

(86) PCT No.: PCT/FR2006/051093
§ 371 (c)(1),
(2), (4) Date: Mar. 10, 2009

(87) PCT Pub. No.: WO2007/051938
PCT Pub. Date: May 10, 2007

(65) Prior Publication Data
US 2009/0218441 A1  Sep. 3, 2009

(30) Foreign Application Priority Data
Oct. 31, 2005  (FR) ..................................... 05 53304

(51) Int. Cl.
*B64D 27/10*  (2006.01)
(52) U.S. Cl. ......................................................... 244/54
(58) Field of Classification Search .................... 244/54, 244/55, 53 R; 248/554–557; 60/796–797
See application file for complete search history.

(56) References Cited

U.S. PATENT DOCUMENTS

| 5,320,307 | A | * | 6/1994 | Spofford et al. ................. 244/54 |
| 5,871,176 | A | * | 2/1999 | Demouzon et al. ............. 244/54 |
| 6,330,995 | B1 | * | 12/2001 | Mangeiga et al. ............ 248/554 |
| 6,347,765 | B1 | * | 2/2002 | Jule et al. ........................ 244/54 |
| 2005/0067528 | A1 | * | 3/2005 | Loewenstein et al. .......... 244/54 |
| 2005/0194493 | A1 | * | 9/2005 | Marche .......................... 244/54 |
| 2005/0269444 | A1 | | 12/2005 | Marche |

FOREIGN PATENT DOCUMENTS

| EP | 0 844 172 A1 | 5/1998 |
| EP | 1 571 080 A1 | 9/2005 |
| JP | 60139599 | 7/1985 |
| JP | 7277290 | 10/1995 |

OTHER PUBLICATIONS

Office Action dated Aug. 28, 2012 for JP Application No. 2008-537157, 3 pages.

* cited by examiner

*Primary Examiner* — Tien Dinh
(74) *Attorney, Agent, or Firm* — Patterson Thuente Christensen Pedersen, P.A.

(57) ABSTRACT

A front attachment device for fastening a turbojet engine to an aircraft fixing strut. The attachment device is adapted to absorb the turbojet engine thrust loads, and includes a top bracket, and a lower bracket. A thrust load absorption vector results from a first convergence point of primary vectors passing through primary fixing points that couple the top bracket to the lower bracket and a second convergence point of secondary vectors passing through secondary fixing points that couple the lower bracket to the turbojet engine. The thrust load absorption vector transmits the turbojet engine thrust loads to the fixing strut, and extends along a longitudinal axis of the turbojet engine.

9 Claims, 3 Drawing Sheets

DEVICE FOR FASTENING A TURBOJET ENGINE TO AN AIRCRAFT FIXING STRUT

RELATED APPLICATIONS

This application is a national stage entry under 35 U.S.C. § 371 of PCT Application No. PCT/FR2006/051093, filed Oct. 24, 2006, which claims priority from French Application Number 0553304, filed Oct. 31, 2005, the disclosures of which are hereby incorporated by reference herein in their entirety.

FIELD OF THE INVENTION

The invention relates to an attachment device for connecting a turbojet engine to an aircraft fixing strut. More particularly, the invention relates to a front attachment device adapted to absorb thrust loads to which an aircraft turbojet engine is submitted.

BACKGROUND OF THE INVENTION

A turbojet engine can be mounted at various locations of an aircraft, through a fixing strut belonging to said aircraft's structure. For instance, the turbojet engine can be suspended, through said fixing strut, to the aircraft wing intrados, or attached laterally to the fuselage, or else mounted, at the rear of the aircraft, on the rear vertical empennage. The function of fastening structures connecting the fixing strut to the turbojet engine is to ensure the transmission of mechanical force between the turbojet engine and the aircraft structure.

The force transmitted to the aircraft structure through the fastening structures are mainly thrust loads from the turbojet engine, extending parallel to the turbojet engine axis, lateral forces mainly due to wind gusts to which the turbojet engine and the aircraft are generally submitted, and vertical forces from said turbojet engine mass. The fastening structures should also absorb turbojet engine distortions, i.e., from dimensional variations due to thermal dilations or contractions during various aircraft flight phases.

Generally, fastening structure for fastening the turbojet engine to the aircraft fixing strut includes a front attachment device and a rear attachment device.

Fastening structures commonly used include the turbojet engine central cowl attached to the fixing strut using a front attachment device and a rear attachment device. In that case, the front attachment device absorbs the turbojet engine thrust loads as well as the lateral and vertical forces. The rear attachment device absorbs lateral and vertical forces.

Other fastening structures include a front attachment device, arranged between the fixing strut and the fan cowl, which absorbs lateral and vertical forces, and a rear attachment device, arranged between the fixing strut and the central cowl, which absorbs thrust loads, lateral forces and vertical forces. Thrust loads are then absorbed through two long rods, connecting the rear attachment device to a front part of the central cowl.

As a result of the turbojet engine thrust loads, and more specifically from said thrust load absorption by the attachment device and the fixing strut, the turbojet engine is submitted to significant bending, which tends to decrease the turbojet engine life span.

The present invention provides a device for fastening a turbojet engine to a fixing strut adapted to absorb the turbojet engine thrust loads and to transmit them to the fixing strut, without subjecting the turbojet engine to significant bending forces.

In that regards, the invention includes a front attachment mechanism, connecting the fixing strut to the turbojet engine fan cowl, forming a thrust load absorption vector resulting from different attachment points between aforesaid front attachment mechanism and the turbojet engine, which is directly coincident with the turbojet engine axis. The front attachment mechanism according to the invention includes an intermediate part, positioned under a main part of the turbojet engine front attachment mechanism. The intermediate part is linked to the main part by a first attachment system, which convergence point is located on the turbojet engine axis. The intermediate part is also connected to the turbojet engine through a second attachment system, which convergence point is also located on the engine axis, but upstream from the first attachment system convergence point. The front attachment mechanism according to the invention behaves as if the engine thrust was transiting between both attachment system convergence points of said front attachment mechanism, i.e. following the turbojet engine axis, and therefore without generating the slightest bending of said turbojet engine, the torque being naturally absorbed completely by the fixing strut.

The second attachment system, connecting the intermediate part to the turbojet engine, includes, for example, a rod system in the front and anti-torque controls in the rear. Front and rear as used herein are designated in relation to the moving direction of an aircraft having such turbojet engine. The intermediate part according to the invention, since the anti-torque controls and rod systems are connecting it, on the one hand, to the turbojet engine and, on the other hand, to the main part of the front attachment mechanism, has particular kinematics enabling a thrust load transfer along the axis of the turbojet engine. The geometry of the front attachment mechanism according to the invention is designed so that the resulting force from the various fixing points is coincident with the turbojet engine axis, so that said turbojet engine is not submitted to any bending force.

Therefore, the invention provides a front attachment device for fastening a turbojet engine to an aircraft fixing strut adapted to absorb said turbojet engine thrust loads, wherein the front attachment device includes a top bracket, a lower bracket, primary fixing points connecting said top bracket to lower bracket, and secondary fixing points connecting said lower bracket to said turbojet engine, the absorbing thrust loads vector which results, on the one hand, from the convergence point of the primary vectors passing through the primary fixing points, and, on the other hand, from the convergence point of the secondary vectors passing through the secondary fixing points, and which transmits the turbojet engine thrust loads to the fixing strut, extends along the axis of the turbojet engine.

Fastening point used herein is defined as any punctual attachment mechanism, enabling connection of one element to another through a specific point.

SUMMARY OF THE INVENTION

In particular examples of embodiment of the front attachment device according to the invention, said device may include all or parts of the following additional characteristics:
   the primary vector convergence point is located on the turbojet engine axis;
   the secondary vector convergence point is located on the turbojet engine axis;
   the primary vector convergence point is located downstream from the secondary vector convergence point;

the front attachment device includes primary attachments with at least one front primary rod and at least one rear primary rod, in order to connect the top bracket and the lower bracket through two primary fixing points;

the front attachment device includes secondary attachments with at least one secondary front rod, and at least two secondary rear rods, in order to connect the lower bracket and the turbojet engine fan cowl through three secondary fixing points;

both secondary rear rods are mounted on the lower bracket through anti-torque controls; and/or the top bracket is also connected to the turbojet engine fan cowl.

The invention will be better understood by reading the following description and examining the accompanying figures.

DETAILED DESCRIPTION OF THE DRAWINGS

Figure 1:
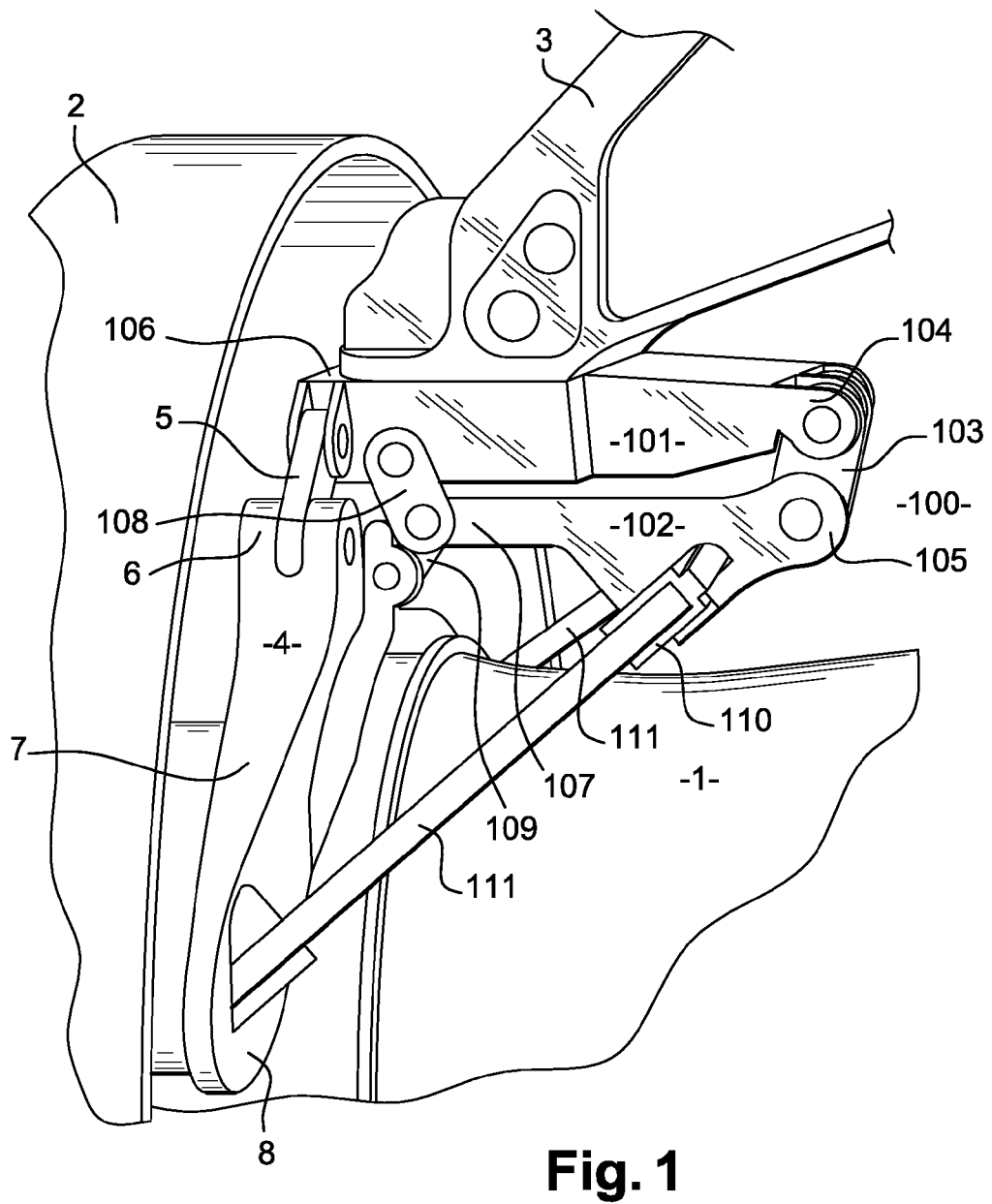
FIG. 1 is a schematic side view depicting a front attachment device according to an embodiment of the invention.
Figure 2:
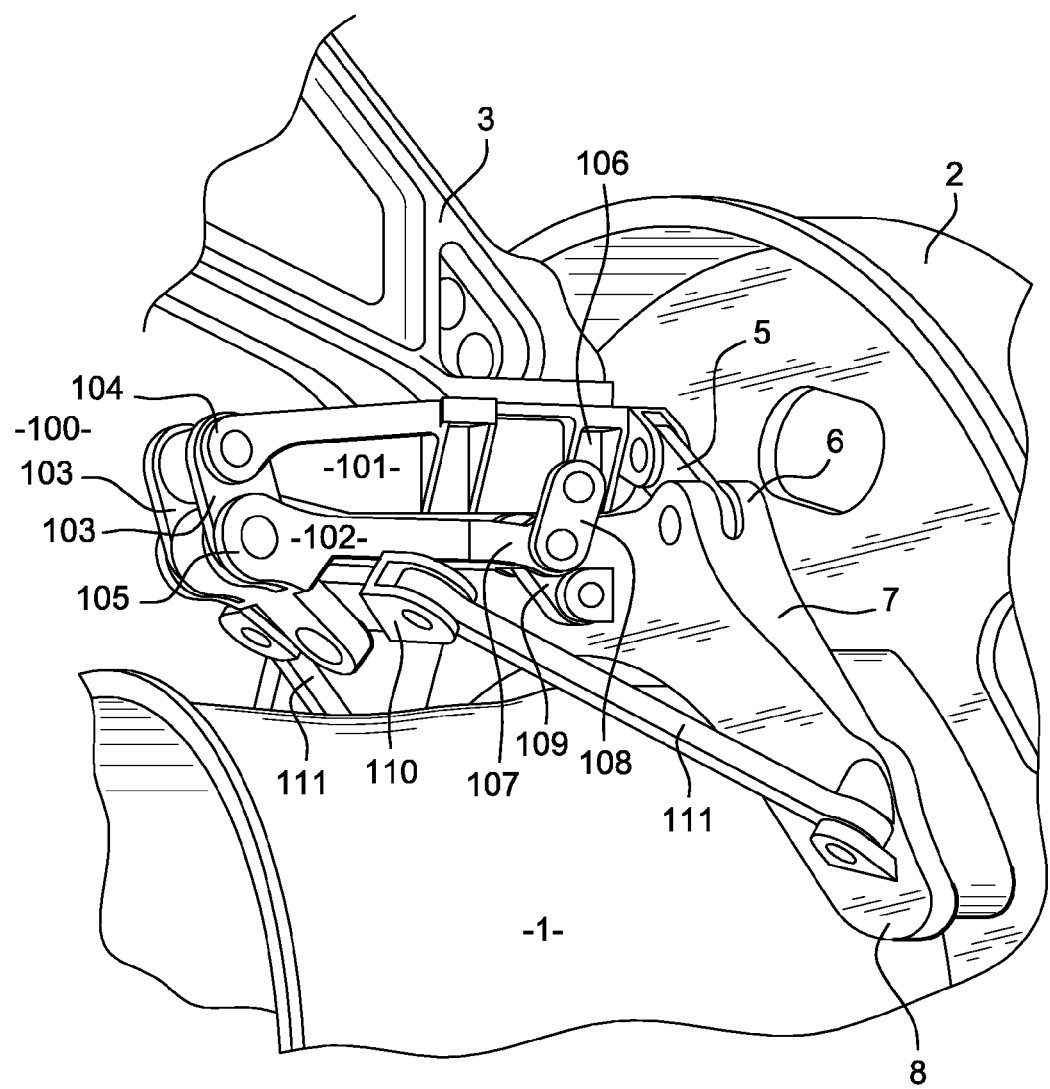
FIG. 2 is a schematic rear view depicting the attachment device of FIG. 1 according to an embodiment of the invention.

In FIGS. 1 and 2, a fixing strut 3 is coupled to a fan cowl 2 of a turbojet engine 1. Fixing strut 3 is connected to aforesaid fan cowl 2 by a front attachment device 100 according to an embodiment of the invention.

Front attachment device 100 includes a top bracket 101 and a lower bracket 102 located below top bracket 101. Top bracket 101 is coupled, in a traditional way, on the one hand, to fixing strut 3 and, on the other hand, to a rear structure 4 of fan cowl 2. More precisely, top bracket 101 is mounted stationary onto fixing strut 3 located above said top bracket 101. The connection between top bracket 101 and a central part 6 of rear structure 4 of fan cowl 2 is secured by two rods 5 (only one rod is visible in FIG. 1). Rear part 4 of fan cowl 2 has a semicircular shape following an upper contour of the cylindrical part of the turbojet engine circular. Rear part 4 of fan cowl 2 has an appreciably inverted-U shape, the base of said U forming central part 6, and each branch 7 of the U fitting on a right or left side of the cylindrical part of turbojet engine 1.

According to an embodiment of the invention, top bracket 101 is connected to lower bracket 102 by primary attachments 103, 108. For example, as represented in FIGS. 1 and 2, top bracket 101 is connected to top bracket 102 by a primary rod system 103, 108. More particularly, two rear primary rods 103 connect a rear extremity 104 of top bracket 101 to a rear extremity 105 of lower bracket 102. Front extremity 106 of top bracket 101 is, itself, connected to front extremity 107 of lower bracket 102 by two front primary rods 108 (only one front primary rod is visible in FIGS. 1 and 2).

Front primary rods 108 and rear primary rods 103 form primary fixing points 103, 108 connecting top bracket 101 to lower bracket 102.

Figure 3A:
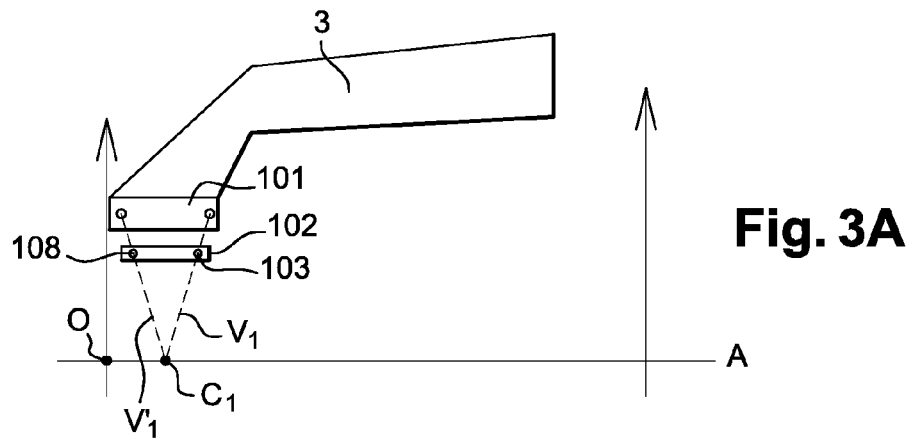
FIGS. 3A, 3B, and 3C are a schematic views depicting the connection between an aircraft's fixing strut, attachment device according to an embodiment of the invention, and turbojet engine.

As represented schematically in FIG. 3A, primary vectors (v1, v'1) passing through primary fixing points 103, 108 between top bracket 101 and lower bracket 102 of front attachment device 100 according to an embodiment of the invention, converge toward a primary convergence point C1 located on axis A of turbojet engine 1.

Lower bracket 102 is, itself, directly connected to rear structure 4 of fan cowl 2 of turbojet engine 1 by secondary attachments 109, 110, 111. Secondary attachments 109, 110, 111 include a secondary front rod 109, connecting front extremity 107 of lower bracket 102 to rear structure 4 of fan cowl 2 of turbojet engine 1. More specifically, secondary front rod 109 is mounted on central part 6 of rear structure 4 of fan cowl 2. Secondary attachments 109, 110, 111 include anti-torque controls 110 located on rear extremity 105 of lower rod 102. Anti-torque controls 110 connect two secondary rear rods 111 to a low part 8 of both branches 7 of rear structure 4 of fan cowl 2. Using anti-torque controls 110 enables an installation with a single degree of freedom for engine thrust, whereas cylindrical shapes of turbojet engine 1 require the installation of two lateral secondary rear rods 111. Thus, each secondary rear rod 111 is connected to a different, right or left, side of turbojet engine 1. Secondary rear rods 111 connect rear extremity 105 of lower bracket 102 to the front of turbojet engine 1. Anti-torque controls 110 require that the force transiting through each secondary rear rods 111 is identical, and that the anti-torque controls 110/secondary rear rods 111 assembly is insensitive to possible distortions of turbojet engine 1.

Figure 3B:
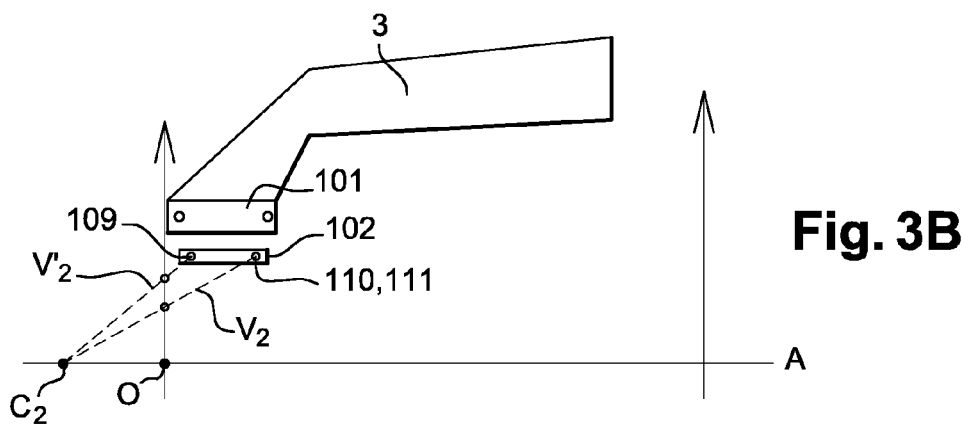

As represented in FIG. 3B, secondary attachments 109, 110, 111 form secondary fixing points connecting lower bracket 102 of front attachment device 100 of the invention to turbojet engine 1. Secondary vectors (v2, v'2) passing through secondary fixing points 109, 110, 111 converge into a secondary convergence point C2 located on axis A of turbojet engine 1. Secondary convergence point C2 is located upstream from primary convergence point C1, in relation to the moving direction of an aircraft provided with turbojet engine 1.

Figure 3C:
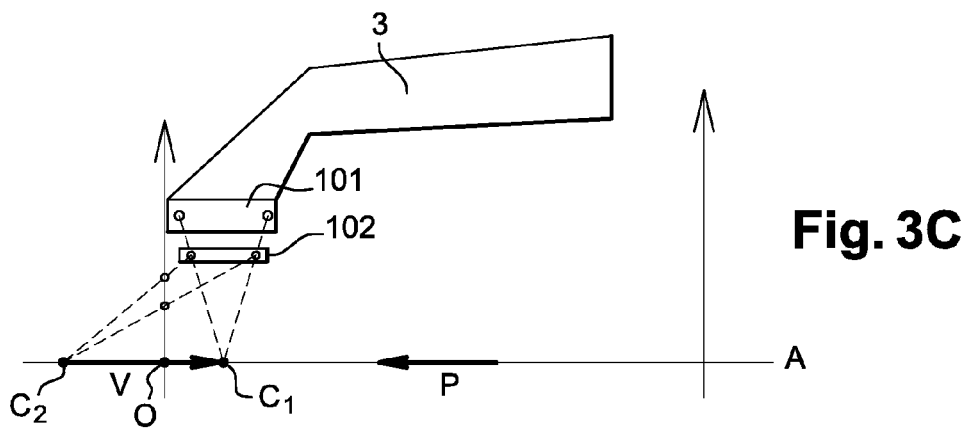

As schematically represented in FIG. 3C, thrust load absorption vector V, resulting from front attachment device 100 according to embodiments of the invention, transits from secondary convergence point C2 to primary convergence point C1, and is coincident with axis A of turbojet engine 1. Also, vector V, intended to absorb thrust loads P, inhibits bending of turbojet engine 1. Thrust load absorption vector V compensates for thrust loads P of turbojet engine 1 along axis A of turbojet engine 1, the torque on fan cowl 2 of turbojet engine 1 then becoming null.

The invention claimed is:

1. A front attachment device for fastening a turbojet engine to an aircraft fixing strut, the attachment device being adapted to absorb turbojet engine thrust loads, wherein the attachment device comprises:

a top bracket;

a lower bracket;

primary attachments operably coupling the top bracket to the lower bracket, each of the primary attachments presenting a primary attachment axis; and secondary attachments adapted to connect the lower bracket to the turbojet engine, each of the secondary attachments presenting a secondary attachment axis, wherein an absorbing thrust load vector extends along a longitudinal axis of the turbojet engine resulting from a first convergence point of primary vectors passing through the primary attachments coincident with the primary attachment axis, and a second convergence point of secondary vectors passing through the secondary attachments coincident with the secondary attachment axis, such that the absorbing thrust load vector is adapted to transmit the turbojet engine thrust loads to the aircraft fixing strut.

2. The front attachment device assembly according to claim 1, wherein the first convergence point of primary vectors is located on the longitudinal axis of the turbojet engine.

3. The front attachment device according to claim 1, wherein the second convergence point of secondary vectors is located on the axis of the turbojet engine.

4. The attachment device according to claim 2, wherein the first convergence point of primary vectors is located downstream from the second convergence point of secondary vectors.

5. The attachment device according to claim 2, the device further comprising a primary attachment assembly, including at least one front primary rod and at least one rear primary rod, such that the top bracket and the lower bracket are operably connected by two primary attachments.

6. The attachment device according to claim 3, the device further comprising a secondary attachment assembly including at least one secondary front rod, and at least two secondary rear rods, such that the turbojet engine and the lower bracket are operably coupled by three secondary attachments.

7. The attachment device according to claim 6, wherein the at least two secondary rear rods are mounted on the lower bracket through anti-torque controls.

8. The attachment device according to claim 1, wherein the top bracket is operably couplable to a fan cowl of the turbojet engine.

9. An attachment device assembly comprising a turbojet engine and the front attachment device according to claim 1.

* * * * *